United States Patent
Yang et al.

(10) Patent No.: US 7,786,038 B2
(45) Date of Patent: Aug. 31, 2010

(54) COMPOSITE METAL OXIDE ADSORBENT FOR FLUORIDE REMOVAL

(75) Inventors: Min Yang, Beijing (CN); Xiaomei Wu, Beijing (CN); Yu Zhang, Beijing (CN); Xiaomin Dou, Beijing (CN)

(73) Assignee: Research Center for Eco-Enviromental Sciences, Chinese Academy of Sciences, Beijing (CN)

( * ) Notice: Subject to any disclaimer, the term of this patent is extended or adjusted under 35 U.S.C. 154(b) by 0 days.

(21) Appl. No.: 12/150,758

(22) Filed: Apr. 29, 2008

(65) Prior Publication Data

US 2009/0270253 A1    Oct. 29, 2009

(51) Int. Cl.
*B01J 20/02* (2006.01)

(52) U.S. Cl. .................. 502/406; 502/302; 502/303; 502/304

(58) Field of Classification Search .............. 502/406, 502/302, 303, 304
See application file for complete search history.

(56) References Cited

U.S. PATENT DOCUMENTS 6,602,814 B1 *  8/2003  Gadow et al. .............. 501/152
2002/0107141 A1 *  8/2002  Yoshikawa ................. 502/304
2005/0232702 A1 * 10/2005  Fujita ....................... 405/129.6
2007/0039814 A1 *  2/2007  Maggard ................. 204/157.15
2007/0114179 A1 *  5/2007  Badger ........................ 210/683
2007/0210004 A1 *  9/2007  Rao et al. .................... 210/681
2008/0073288 A1 *  3/2008  Fan et al. .................... 210/748
2008/0112109 A1 *  5/2008  Muto et al. ............... 361/301.4

OTHER PUBLICATIONS

Jiao, Zhong-zhi, et al., "Removal of fluoride using rare earth based inorganic adsorbent," *Environmental Chemistry* (Jul. 2002) 21(4): 365-370.

* cited by examiner

*Primary Examiner*—Timothy C Vanoy
*Assistant Examiner*—Michelle Hou
(74) *Attorney, Agent, or Firm*—Townsend and Townsend and Crew LLP

(57) ABSTRACT

The invention provides a composite metal oxide adsorbent for fluoride removal and the preparation method thereof. Said composite metal oxide adsorbent for fluoride removal comprises: 0.05-0.15 molar parts of transition metal, 0.2-0.6 molar parts of Al and/or Mg, and 0.05-0.15 molar parts of rare earth metal. The composite metal oxide adsorbent for fluoride removal has a saturation adsorption capacity on fluorine in water of up to 229 mg/g, under a neutral condition.

6 Claims, No Drawings

COMPOSITE METAL OXIDE ADSORBENT FOR FLUORIDE REMOVAL

TECHNICAL FIELD

The present invention belongs to the field of adsorptive material technology, and particularly, relates to a composite metal oxide adsorbent for fluoride removal.

BACKGROUND ART

Fluorosis caused by drinking high-fluoride water is one of the endemic diseases spreading mostly all over the world. In China, except in Shanghai, fluorosis caused by drinking high-fluorine water has been found in the rest provinces, autonomous regions and municipalities. Therefore, there is a strict standards for the fluoride content in drinking water internationally, and the World Health Organization has set a guideline limit of 0.6-1.5 mg/L for fluoride in drinking water. In China, the maximum contaminant level (MCL) of fluoride in drinking water is 1.0 mg/L, and the MCL of the inorganic fluorine compounds in industrial waste water is 10 mg/L.

Among various fluoride removal methods for drinking water, adsorption method has been regarded as one of the most promising methods. And the key of adsorption method is adsorbent. At present, active alumina as a fluoride adsorbent is most widely used in China and abroad, which has an optimal operation pH of 5 and the adsorption capacity thereof is relatively small because the saturation adsorption capacity thereof is generally 10-20 mg/g. Furthermore, the regeneration by aluminum sulfate will easily cause the leaching of aluminum, so this method has relatively more problems in actual application. Therefore, high attention has been paid to the research and development of a new adsorbent for substituting active alumina internationally. In addition to performing an improving research on the conventional materials of active alumina, bone charcoal and the like, the trend of fluoride removal research nowadays is that more attentions have been paid to the development and screening of a fluoride adsporption material with good fluoride removal effect, wide application range and stable performance.

In recent years, some research indicated that multivalent metal compounds of rare earths, iron, manganese and the like have a high ability of anions adsorption. In a paper entitled "Removal of Fluoride Using Rare Earth Based Inorganic Adsorbent" (Environmental Chemistry, V21, No. 4, July, 2002) by Zhongzhi JIAO, Yu ZHANG, Min YANG et. al., a Ce—Fe adsorbent was reported and the fluoride adsorption tests indicates that the Ce—Fe bimetal oxide shown a high fluoride adsorption capacity in pH range 3-5, when pH approaches neutrality (the normal pH range of drinking water is 6.5-8.5), the fluoride adsorption performance thereof is relatively poor.

DISCLOSURE OF THE INVENTION

Aiming at solving the problems of low adsorption capacity and acidic applicable pH range and the like generally existed in the present fluoride adsorbents, an object of the invention is to provide a composite metal oxide adsorbent for fluoride removal, that is, a composite metal oxide adsorbent of transition metal (Fe, Ti, Mn and the like)-Al and/or Mg-rare earth metal type (including Ce, La and the like), and it has a high fluoride adsorption capacity and near neutral pH applicable range.

The technical problems described above can be solved by the following technical solutions of the invention.

That is, in one aspect of the invention, the invention provides a composite metal oxide fluoride adsorbent comprising:
  0.05-0.15 molar parts of transition metal,
  0.2-0.6 molar parts of Al and/or Mg, and
  0.05-0.15 molar parts of rare earth metal.

Preferably, said transition metal is one or more selected from the group consisting of Fe, Ti, and Mn.

Preferably, said rare metal is Ce and/or La.

Preferably, said composite metal oxide fluoride adsorbent comprises:
  0.08-0.12 molar parts of transition metal,
  0.35-0.45 molar parts of Al and/or Mg, and
  0.06-0.1 molar parts of rare earth metal.

Further preferably, said composite metal oxide fluoride adsorbent comprises:
  about 0.1 molar parts of transition metal,
  about 0.4 molar parts of Al and/or Mg, and
  about 0.1 molar parts of rare earth metal.

In another aspect of the invention, a method of preparing the composite metal oxide fluoride adsorbent as described above is provided, comprising the steps of:

1) preparing an aqueous solution including a transition metal-containing compound, an aluminum(magnesium)-containing compound and a rare earth metal-containing compound, wherein, 0.05-0.15 molar parts of transition metal, 0.2-0.6 molar parts of Al and/or Mg and 0.05-0.15 molar parts of rare earth metal are included in said aqueous solution; and 2) adjusting the pH of said aqueous solution to be 8.0 or more.

Preferably, said transition metal-containing compound is one or more selected from the group consisting of the nitrate, and chloride and sulfate of the transition metal.

Preferably, said aluminum(magnesium)-containing compound is one or more selected from the group consisting of aluminum sulfate, aluminum nitrate, aluminum chloride, magnesium sulfate, magnesium nitrate, and magnesium chloride.

Said rare earth metal-containing compound is one or more selected from the group consisting of cerium chloride, cerium nitrate, cerium sulfate, lanthanum chloride, lanthanum nitrate, and lanthanum sulfate.

Preferably, in said aqueous solution in Step 1), 0.08-0.12 molar parts of transition metal, 0.35-0.45 molar parts of Al and/or Mg, and 0.06-0.1 molar parts of rare earth metal are included.

Preferably, in said aqueous solution in Step 1), about 0.1 molar parts of transition metal, about 0.4 molar parts of Al, Mg, and about 0.1 molar parts of rare earth metal are included.

The composite metal oxide fluoride adsorbent of the invention has specific adsorption performance based on the adsorption of metal oxides for anions. It is commonly considered at appropriate pH, a hydroxylation will occur on the surface of a mineral so as to form a series of metal hydroxide and polyhydroxy metal oxide hydrates when a metal oxide in a solution. The presence of surface hydroxy groups as functional groups makes the adsorbent having a strong affinity for fluoride and exerting the exchange function of the hydroxy groups by the chemical bond chemical adsorption, electrostatic adsorption and ion exchange adsorption and the like so as to adsorb and fix the fluorides; and under a neutral condition (pH=7.0), the saturation adsorption capacity for fluoride is up to 229 mg/g, preferably 100 mg/g or more, more preferably 130 mg/g, and most preferably 150 mg/g. In the aspect of saturation adsorption capacity, the composite metal oxide fluoride adsorbent of the invention is better than a common fluoride adsorption material such as active alumina (the saturation adsorption capacity thereof is 10 to 20 mg/g).

BEST MODES OF CARRYING OUT THE INVENTION

The composite metal oxide adsorbent for fluoride removal provided by the invention comprises a transition metal, Al and/or Mg as well as a rare earth metal; wherein the molar ratio of said transition metal, Al and/or Mg, and rare earth metal is: 0.05-0.15:0.2-0.6:0.05-0.15;

Said transition metal is Fe, Ti, and/or Mn.

Said rare earth metal is Ce and/or La.

The molar ratio of Fe:Al and/or Mg: rare earth metal can be: 0.08-0.12:0.35-0.45:0.06-0.1;

The molar ratio of Fe:Al and/or Mg: rare earth metal can also be: 0.1:0.4:0.1.

Under a neutral condition (pH=7.0), the composite metal oxide adsorbent for fluoride removal provided by the invention can have a saturation fluoride adsorption capacity of up to 229 mg/g in water which is better than that of the common fluoride adsorption material such as active alumina (the saturation adsorption capacity thereof is 10~20 mg/g).

The method of preparing the composite metal oxide adsorbent for fluoride removal provided by the invention comprises the steps of:

1) dissolving compounds containing transition metal, aluminum/magnesium, and rare earth metal such that the molar ratio of transition metal, aluminum/magnesium and rare earth metal is 0.05-0.15:0.20-0.60:0.05-0.15, to form an aqueous solution, and stirring the solution uniformly under room temperature; wherein Said transition metal is one or more selected from the group consisting of Fe, Ti, and Mn.

Said transition metal-containing compound is a water soluble salt, such as the nitrate, chloride, alkoxide or sulfate of the transition metal;

Said aluminum and/or magnesium-containing compound is a water soluble salt, such as one or more of aluminum sulfate, aluminum nitrate, aluminum chloride, magnesium sulfate, magnesium nitrate or magnesium chloride;

Said rare earth metal is Ce and/or La; and

Said rare earth metal-containing compound is a water soluble salt, such as cerium chloride, cerium nitrate, cerium sulfate, lanthanum chloride, lanthanum nitrate or lanthanum sulfate.

2) adding dropwise an alkali solution (which can be a solution of sodium hydroxide, ammonia, sodium carbonate, sodium bicarbonate or the like) into the solution described above with stirring, until the pH of the solution is 8.0 or more; and settling; and washing with deionized water and separating by centrifuge until the pH of the water flowing out is neutral.

3) drying the washed product at 65-120° C. to a constant weight and baking for 0-3 h at 250-500° C., and remilling so as to obtain the composite metal oxide adsorbent for fluoride removal of the invention.

Preferably, the molar ratio of said transition metal, aluminum and/or magnesium, and rare earth metal in Step 1) is 0.08-0.12:0.35-0.45:0.06-0.1.

Further preferably, the molar ratio of said transition metal, aluminum and/or magnesium, and rare earth metal in Step 1) is 0.1:0.4:0.1.

The method for preparing the aqueous solution in Step 1) is not particularly limited, as long as the solution comprises 0.05-0.15 molar parts of transition metal, 0.2-0.6 molar parts of Al and/or Mg, and 0.05-0.15 molar parts of rare earth metal. For example, it can be performed by dissolving a transition metal-containing compound, a aluminum and/or magnesium containing compound and a rare earth metal-containing compound into water simultaneously, and it can also be performed by dissolving firstly one of them into water, and then dissolving the second component, and finally the third component.

Furthermore, several solutions containing one or more of a transition metal-containing compound, a aluminum and/or magnesium-containing compound and a rare earth metal-containing compound can be prepared firstly, then these solutions are mixed to form a aqueous solution so that 0.05-0.15 molar parts of transition metal, 0.2-0.6 molar parts of Al and/or Mg, 0.05-0.15 molar parts of rare earth metal are included in the aqueous solution described above.

In terms of transition metal, the concentration of the transition metal-containing compound in water is: 0.05~0.15 mol/L.

In terms of aluminum and/or magnesium, the concentration of the aluminum and/or magnesium-containing compound in water is: 0.2~0.6 mol/L.

In terms of rare earth metal, the concentration of the rare earth metal-containing compound in water is: 0.05~0.15 mol/L.

When preparing the aqueous solution in Step 1), the temperature is room temperature to 50° C.

The aqueous solution in Step 1) can also be prepared under an acidic condition. The acid used for making the aqueous solution to be acidic can be nitric acid, hydrochloric acid, sulfuric acid or the like.

A rare earth oxide, alumina and/or magnesium and a transition metal oxide can be used as a raw material for preparing the aqueous solution in Step 1). In case of that, acid is preferably used to dissolve them.

In Step 2), the method for making the pH of the aqueous solution to be 8.0 or more is not particularly limited. The addition of an inorganic alkali into the solution can be used.

Said alkali is preferably sodium hydroxide, ammonia, sodium carbonate, sodium bicarbonate, potassium hydroxide, potassium carbonate, potassium bicarbonate or the like.

The settling time is not particularly limited, but preferably to be 1 minute to 100 hours, preferably 10 minutes to 20 hours, particularly preferably 30 minutes to 8 hours.

The washing times with deionized water and the amount of the deionzed water are not particularly limited as long as the washing is performed until the pH of the water flowing out is neutral.

In Step 3), the washed product is dried to a constant weight and preferably dried at 65-120° C. to a constant weight.

Then, the product dried to a constant weight is baked at 250-500° C. for 1-3 hours.

Then, it is grinded with a milling machine. The diameter of the powder obtained from the milling is not particularly limited and can be selected according to the desired purpose, but preferably to be 20~250 meshes, more preferably 40~200 meshes, and particularly preferably 150~200 meshes.

Using the method described above, the composite metal oxide adsorbent for fluoride of the invention is prepared.

The ratio among the transition metal, aluminum/magnesium, and rare earth metal in the composite metal oxide adsorbent for fluoride removal of the invention can be determined by element analysis method. Specifically, the apparatus used is ICP-AES (Model 9000, ULTIMA, France).

The composite metal oxide adsorbent for fluoride removal of the invention can be used to remove fluoride in water, including fluoride in drinking water and waste water.

Example 1

22.48 g of iron sulfate nonahydrate, 66.64 g of aluminum sulfate octodecahydrate and 18.56 g of lanthanum trichloride heptahydrate were weighted and put into a 1 L beaker. 500 ml of water was added and dissolution was performed by magnetic stirring. After the dissolution completed, it was waited for 30 min and then under a condition of mechanical stirring of 150 rpm, a 6 mol/L sodium hydroxide solution was added dropwise slowly so that the pH of the suspension was raised gradually until pH was 8.0. The amount of the 6 mol/L sodium hydroxide solution added in the whole process was 80 ml and the completion of the whole process needed 8 h.

After the process described above completed, the precipitate formed was settled for 24 h and then washed with deionized water. The precipitate was put into a centrifugal cup and washed. After removing the supernatant, the precipitate at the bottom of the centrifugal cup was transferred into a 2 L beaker. 1.6 L of deionized water was added and then a sufficient stirring was performed with a glass rod. Then, the suspension was reloaded into the centrifugal cup to be centrifuged and the supernatant was removed. The above process was repeated for 10 times, and at this time, the conductivity of the centrifugal supernatant was about 1.2 mS/cm and the pH was near neutral.

The washed product was dried in a baking oven at 100° C. for 20 h. The blocks obtained were grinded in a sample grinder and then sieved through a 200 mesh sample screen. The powders sieved were the composite metal oxide adsorbent for fluoride removal of the invention obtained. The average particle diameter of the adsorbent powders obtained was 0.75 microns and the weight of the sample was 25 g.

The molar ratio of Fe:Al:La in the composite metal oxide adsorbent for fluoride removal was 0.08:0.2:0.05.

0.15 g of the composite metal oxide was added into a 1 L aqueous solution formulated with a fluoride initial concentration of 45.0 mg/L (wherein, the concentration of sodium perchlorate as a background electrolyte was 0.1 mol/L and the fluorine salt was analytical pure sodium fluoride) and the initial pH of the solution was adjusted to be 7.0±0.1 with a diluted perchloric acid and a diluted sodium hydroxide. After an oscillating speed of 180 rpm and an equilibrium time of 2 h, the solution was filtered through a 0.45 μm filter membrane and the fluoride concentration in the solution was measured with the fluoride selective electrode method. The equilibrium concentration of fluoride measured was 36.5 mg/L and the adsorption capacity of the composite metal oxide on fluorine obtained was 57 mg/g (that is, each gram of the composite metal oxide adsorbent adsorbed 57 mg of fluoride). This adsorption capacity was the equilibrium adsorption capacity under the present condition.

Example 2

6.34 g of anhydrous ferrous chloride, 66.64 g of aluminum sulfate octodecahydrate and 18.56 g of lanthanum trichloride heptahydrate were weighted and put into a 1 L beaker. 500 ml of water was added and dissolution was performed by magnetic stirring. After the dissolution completed, it was waited for 30 min and then under a condition of mechanical stirring of 150 rpm, a 6 mol/L sodium hydroxide solution was added dropwise slowly so that the pH of the suspension was raised gradually until pH was 8.5. The amount of the 6 mol/L sodium hydroxide solution added in the whole process was 60 ml and the completion of the whole process needed 7 h.

After the process described above completed, the precipitate formed was settled for 24 h and then washed with deionized water. The precipitate was put into a centrifugal cup and washed. After removing the supernatant, the precipitate at the bottom of the centrifugal cup was transferred into a 2 L beaker. 1.6 L of deionized water was added and then a sufficient stirring was performed with a glass rod. Then, the suspension was reloaded into the centrifugal cup to be centrifuged and the supernatant was removed. The above process was repeated for 9 times, and at this time, the conductivity of the centrifugal supernatant was about 1.2 mS/cm and the pH was near neutral.

The washed product was dried in a baking oven for 20 h at 65° C. and then baked at 300° C. for 3 h. The blocks obtained were grinded in a sample grinder and then sieved through a 200 mesh sample screen. The powders sieved were the composite metal oxide adsorbent for fluoride removal of the invention obtained. The average particle diameter of the adsorbent powders obtained was 0.75 microns and the weight of the sample was 35 g.

The molar ratio of Fe:Al:La in the composite metal oxide adsorbent for fluoride removal was 0.05:0.2:0.05.

0.15 g of the composite metal oxide was added into a aqueous solution formulated with a fluoride initial concentration of 45.0 mg/L (wherein, the concentration of sodium perchlorate as a background electrolyte was 0.1 mol/L and the fluorine salt was analytical pure sodium fluoride) and the initial pH was adjusted to be 7.0±0.1 with a diluted perchloric acid and a diluted sodium hydroxide. After an oscillating speed of 180 rpm and an equilibrium time of 2 h, the solution was filtered through a 0.45 μm filter membrane and the fluoride concentration in the solution was measured with the fluoride selective electrode method. The equilibrium concentration of fluoride measured was 32.6 mg/L and the fluoride adsorption capacity of the composite metal oxide obtained was 83 mg/g (that is, each gram of the composite metal oxide adsorbent adsorbed 83 mg fluoride). This adsorption capacity can be regarded as the equilibrium adsorption capacity under the present condition.

Example 3

43.06 g of manganese nitrate hexahydrate, 74.97 g of aluminum sulfate octodecahydrate and 16.16 g of cerium sulfate tetrahydrate were weighted and put into a 1 L beaker. 500 ml of water was added and dissolution was performed by magnetic stirring. After the dissolution completed, it was waited for 30 min and then under a condition of mechanical stirring of 150 rpm, a 6 mol/L sodium hydroxide solution was added dropwise slowly so that the pH of the suspension was raised gradually until pH was 9.0. The amount of the 6 mol/L sodium hydroxide solution added in the whole process was 70 ml and the completion of the whole process needed 8 h.

After the process described above completed, the precipitate formed was settled for 24 h and then washed with deionized water. The precipitate was put into a centrifugal cup and washed. After removing the supernatant, the precipitate at the bottom of the centrifugal cup was transferred into a 2 L beaker. 1.6 L of deionized water was added and then a sufficient stirring was performed with a glass rod. Then, the suspension was reloaded into the centrifugal cup to be centrifuged and the supernatant was removed. The above process was repeated for 11 times, and at this time, the conductivity of the centrifugal supernatant was about 1.2 mS/cm and the pH was near neutral.

The washed product was dried in a baking oven for 20 h at 100° C. and then baked at 200° C. for 3 h. The blocks obtained were grinded in a sample grinder and then sieved through a 200 mesh sample screen. The powders sieved were the composite metal oxide adsorbent for fluoride removal of the invention obtained. The average particle diameter of the adsorbent powders obtained was 0.75 microns and the weight of the sample was 46 g.

The molar ratio of Mn:Al:Ce in the composite metal oxide adsorbent for fluoride removal was 0.15:0.45:0.08.

0.15 g of the composite metal oxide was added into a 1 L aqueous solution formulated with a fluoride initial concentration of 45.0 mg/L (wherein, the concentration of sodium perchlorate as a background electrolyte was 0.1 mol/L and the fluorine salt was analytical pure sodium fluoride) and the initial pH was adjusted to be 7.0±0.1 with a diluted perchloric acid and a diluted sodium hydroxide. After an oscillating speed of 180 rpm and an equilibrium time of 2 h, the solution was filtered through a 0.45 μm filter membrane and the fluoride concentration in the solution was measured with the fluoride selective electrode method. The equilibrium concentration of fluoride measured was 31.8 mg/L and the fluoride adsorption capacity of the composite metal oxide obtained was 88 mg/g (that is, each gram of the composite metal oxide adsorbent adsorbed 88 mg of fluoride). This adsorption capacity can be regarded as the equilibrium adsorption capacity under the present condition.

Example 4

14.65 g of titanium nitrate, 37.51 g of aluminum nitrate nonahydrate and 20.2 g of cerium sulfate hexahydrate were weighted and put into a 1 L beaker. 500 ml of water was added and dissolution was performed by magnetic stirring. After the dissolution completed, it was waited for 30 min and then under a condition of mechanical stirring of 150 rpm, a 6 mol/L sodium hydroxide solution was added dropwise slowly so that the pH of the suspension was raised gradually until pH was 9.5. The amount of the 6 mol/L sodium hydroxide solution added in the whole process was 70 ml and the completion of the whole process needed 6 h.

After the process described above completed, the precipitate formed was settled for 24 h and then washed with deionized water. The precipitate was put into a centrifugal cup and washed. After removing the supernatant, the precipitate at the bottom of the centrifugal cup was transferred into a 2 L beaker. 1.6 L of deionized water was added and then a sufficient stirring was performed with a glass rod. Then, the suspension was reloaded into the centrifugal cup to be centrifuged and the supernatant was removed. The above process was repeated for 12 times, and at this time, the conductivity of the centrifugal supernatant was about 1.2 mS/cm and the pH was near neutral.

The washed product was dried in a baking oven for 24 h at 65° C. and then baked at 300° C. for 1.5 h. The blocks obtained were grinded in a sample grinder and then sieved through a 200 mesh sample screen. The powders sieved were the composite metal oxide adsorbent for fluoride removal of the invention obtained. The average particle diameter of the adsorbent powders obtained was 0.75 microns and the weight of the sample was 32 g.

The molar ratio of Ti:Al:Ce in the composite metal oxide adsorbent for fluoride removal was 0.1:0.2:0.1.

0.15 g of the composite metal oxide was added into a 1 L aqueous solution formulated with a fluoride initial concentration of 45.0 mg/L (wherein, the concentration of sodium perchlorate as a background electrolyte was 0.1 mol/L and the fluorine salt was analytical pure sodium fluoride) and the initial pH was adjusted to be 7.0±0.1 with a diluted perchloric acid and a diluted sodium hydroxide. After an oscillating speed of 180 rpm and an equilibrium time of 2 h, the solution was filtered through a 0.45 μm filter membrane and the fluoride concentration in the solution was measured with the fluoride selective electrode method. The equilibrium concentration of fluoride measured was 37.2 mg/L and the fluoride adsorption capacity of the composite metal oxide obtained was 52 mg/g (that is, each gram of the composite metal oxide adsorbent adsorbed 52 mg of fluoride). This adsorption capacity can be regarded as the equilibrium adsorption capacity under the present condition.

Example 5

14.65 g of manganese sulfate monohydrate, 66.64 g of aluminum sulfate octodecahydrate and 20.2 g of cerium sulfate tetrahydrate were weighted and put into a 1 L beaker. 500 ml of water was added and dissolution was performed by magnetic stirring. After the dissolution completed, it was waited for 30 min and then under a condition of mechanical stirring of 150 rpm, a 6 mol/L sodium hydroxide solution was added dropwise slowly so that the pH of the suspension was raised gradually until pH was 9.0. The amount of the 6 mol/L sodium hydroxide solution added in the whole process was 70 ml and the completion of the whole process needed 7 h.

After the process described above completed, the precipitate formed was settled for 24 h and then washed with deionized water. The precipitate was put into a centrifugal cup and washed. After removing the supernatant, the precipitate at the bottom of the centrifugal cup was transferred into a 2 L beaker. 1.6 L of deionized water was added and then a sufficient stirring was performed with a glass rod. Then, the suspension was reloaded into the centrifugal cup to be centrifuged and the supernatant was removed. The above process was repeated for 10 times or more, and at this time, the conductivity of the centrifugal supernatant was about 1.2 mS/cm and the pH was near neutral.

The washed product was dried in a baking oven for 24 h at 80° C. and then baked at 250° C. for 3 h. The blocks obtained were grinded in a sample grinder and then sieved through a 200 mesh sample screen. The powders sieved were the composite metal oxide adsorbent for fluoride removal of the invention obtained. The average particle diameter of the adsorbent powders obtained was 0.75 microns and the weight of the sample was 40 g.

The molar ratio of Mn:Al:Ce in the composite metal oxide adsorbent for fluoride removal was 0.1:0.4:0.1.

0.15 g of the composite metal oxide was added into a 1 L aqueous solution formulated with a fluoride initial concentration of 45.0 mg/L (wherein, the concentration of sodium perchlorate as a background electrolyte was 0.1 mol/L and the fluorine salt was analytical pure sodium fluoride) and the initial pH was adjusted to be 7.0±0.1 with a diluted perchloric acid and a diluted sodium hydroxide. After an oscillating speed of 180 rpm and an equilibrium time of 2 h, the solution was filtered through a 0.45 μm filter membrane and the fluoride concentration in the solution was measured with the fluoride selective electrode method. The equilibrium concentration of fluoride measured was 31 mg/L and the fluoride adsorption capacity of the composite metal oxide obtained was 93 mg/g (that is, each gram of the composite metal oxide adsorbent adsorbed 93 mg of fluoride). This adsorption capacity can be regarded as the equilibrium adsorption capacity under the present condition.

Example 6

13.90 g of ferrous sulfate hexahydrate, 66.64 g of aluminum sulfate octodecahydrate and 20.22 g of cerium sulfate tetrahydrate were weighted and put into a 1 L beaker. 500 ml of water was added and dissolution was performed by magnetic stirring. After the dissolution completed, it was waited for 30 min and then under a condition of mechanical stirring of 150 rpm, a 6 mol/L sodium hydroxide solution was added dropwise slowly so that the pH of the suspension was raised gradually until pH was 9.0. The amount of the 6 mol/L sodium hydroxide solution added in the whole process was 70 ml and the completion of the whole process needed 7 h.

After the process described above completed, the precipitate formed was settled for 24 h and then washed with deionized water. The precipitate was put into a centrifugal cup and washed. After removing the supernatant, the precipitate at the bottom of the centrifugal cup was transferred into a 2 L beaker. 1.6 L of deionized water was added and then a sufficient stirring was performed with a glass rod. Then, the suspension was reloaded into the centrifugal cup to be centrifuged and the supernatant was removed. The above process was repeated for 10 times or more, and at this time, the conductivity of the centrifugal supernatant was about 1.2 mS/cm and the pH was near neutral.

The washed product was dried in a baking oven for 24 h at 65° C. and then baked at 300° C. for 3 h. The blocks obtained were grinded in a sample grinder and then sieved through a 200 mesh sample screen. The powders sieved were the composite metal oxide fluoride adsorbent of the invention obtained. The average particle diameter of the adsorbent powders obtained was 0.75 microns and the weight of the sample was 41 g.

The molar ratio of Fe:Al:Ce in the composite metal oxide fluoride adsorbent was 0.1:0.4:0.1.

0.15 g of the composite metal oxide was added into a aqueous solution formulated with a fluoride initial concentration of 45.0 mg/L (wherein, the concentration of sodium perchlorate as a background electrolyte was 0.1 mol/L and the fluorine salt was analytical pure sodium fluoride) and the initial pH was adjusted to be 7.0±0.1 with a diluted perchloric acid and a diluted sodium hydroxide. After an oscillating speed of 180 rpm and an equilibrium time of 2 h, the solution was filtered through a 0.45 μm filter membrane and the fluoride concentration in the solution was measured with the fluoride selective electrode method. The equilibrium concentration of fluoride measured was 26.2 mg/L and the fluoride adsorption capacity of the composite metal oxide obtained was 125 mg/g (that is, each gram of the composite metal oxide adsorbent adsorbed 125 mg of fluoride). This adsorption capacity can be regarded as the equilibrium adsorption capacity under the present condition.

Example 7

13.9 g of ferrous sulfate hexahydrate, 40.66 g of magnesium chloride hexahydrate and 20.22 g of cerium sulfate tetrahydrate were weighted and put into a 1 L beaker. 500 ml of water was added and dissolution was performed by magnetic stirring. After the dissolution completed, it was waited for 30 min and then under a condition of mechanical stirring of 150 rpm, a 6 mol/L sodium hydroxide solution was added dropwise slowly so that the pH of the suspension was raised gradually until pH was 8.5. The amount of the 6 mol/L sodium hydroxide solution added in the whole process was 70 ml and the completion of the whole process needed 6 h.

After the process described above completed, the precipitate formed was settled for 24 h and then washed with deionized water. The precipitate was put into a centrifugal cup and washed. After removing the supernatant, the precipitate at the bottom of the centrifugal cup was transferred into a 2 L beaker. 1.6 L of deionized water was added and then a sufficient stirring was performed with a glass rod. Then, the suspension was reloaded into the centrifugal cup to be centrifuged and the supernatant was removed. The above process was repeated for 12 times, and at this time, the conductivity of the centrifugal supernatant was about 1.2 mS/cm and the pH was near neutral.

The washed product was dried in a baking oven for 24 h at 65° C. The blocks obtained were grinded in a sample grinder and then sieved through a 200 mesh sample screen. The powders sieved were the composite metal oxide adsorbent for fluoride removal of the invention obtained. The average particle diameter of the adsorbent powders obtained was 0.75 microns and the weight of the sample was 32 g.

The molar ratio of Fe:Mg:Ce in the composite metal oxide adsorbent for fluoride removal was 0.1:0.4:0.1.

0.15 g of the composite metal oxide was added into a 1 L aqueous solution formulated with a fluoride initial concentration of 45.0 mg/L (wherein, the concentration of sodium perchlorate as a background electrolyte was 0.1 mol/L and the fluorine salt was analytical pure sodium fluoride) and the initial pH was adjusted to be 7.0±0.1 with a diluted perchloric acid and a diluted sodium hydroxide. After an oscillating speed of 180 rpm and an equilibrium time of 2 h, the solution was filtered through a 0.45 μm filter membrane and the fluoride concentration in the solution was measured with the fluoride selective electrode method. The equilibrium concentration of fluoride measured was 27.9 mg/L and the fluoride adsorption capacity of the composite metal oxide obtained was 114 mg/g (that is, each gram of the composite metal oxide adsorbent adsorbed 114 mg of fluoride). This adsorption capacity can be regarded as the equilibrium adsorption capacity under the present condition.

Comparative Example 1

7.351 g of calcium chloride dihydrate, 75.03 g of aluminum nitrate nonahydrate and 30.32 g of cerium sulfate tetrahydrate were weighted and put into a 1 L beaker. 500 ml of water was added and dissolution was performed by magnetic stirring. After the dissolution completed, it was waited for 30 min and then under a condition of mechanical stirring of 150 rpm, a 6 mol/L sodium hydroxide solution was added dropwise slowly so that the pH of the suspension was raised gradually until pH was 9.0. The amount of the 6 mol/L sodium hydroxide solution added in the whole process was 70 ml and the completion of the whole process needed 8 h.

After the process described above completed, the precipitate formed was settled for 24 h and then washed with deionized water. The precipitate was put into a centrifugal cup and washed. After removing the supernatant, the precipitate at the bottom of the centrifugal cup was transferred into a 2 L beaker. 1.6 L of deionized water was added and then a sufficient stirring was performed with a glass rod. Then, the suspension was reloaded into the centrifugal cup to be centrifuged and the supernatant was removed. The above process was repeated for 12 times, and at this time, the conductivity of the centrifugal supernatant was about 1.2 mS/cm and the pH was near neutral.

The washed product was dried in a baking oven for 20 h at 110° C. and then baked at 400° C. for 2.5 h. The blocks obtained were grinded in a sample grinder and then sieved through a 200 mesh sample screen. The powders sieved were the composite metal oxide of the invention obtained. The average particle diameter of the adsorbent powders obtained was 0.75 microns and the weight of the sample was 40 g.

The molar ratio of Ca:Al:Ce in the composite metal oxide was 0.1:0.4:0.1.

0.15 g of the composite metal oxide was added into a 1 L aqueous solution formulated with a fluoride initial concentration of 45.0 mg/L (wherein, the concentration of sodium perchlorate as a background electrolyte was 0.1 mol/L and the fluorine salt was analytical pure sodium fluoride) and the initial pH was adjusted to be 7.0±0.1 with a diluted perchloric acid and a diluted sodium hydroxide. After an oscillating speed of 180 rpm and an equilibrium time of 2 h, the solution was filtered through a 0.45 μm filter membrane and the fluoride concentration in the solution was measured with the fluoride selective electrode method. The equilibrium concentration of fluoride measured was 41.2 mg/L and the fluoride adsorption capacity of the composite metal oxide obtained was 25 mg/g (that is, each gram of the composite metal oxide fluoride adsorbent adsorbed 25 mg of fluoride). This adsorption capacity can be regarded as the equilibrium adsorption capacity under the present condition.

Comparative Example 2

The fluoride adsorbent reported in Environmental Chemistry, V21, No. 4, 2002.7, at pH=3.0 had an equilibrium concentration of fluoride of 25 mg/L, and an adsorption capacity of about 65 mg/g.

What is claimed is:

1. A composite metal oxide adsorbent for fluoride removal consisting of a transition metal, Al and/or Mg, and a rare earth metal, wherein the molar ratio of the transition metal, Al and/or Mg, and the rare earth metal is 0.05-0.15:0.2-0.6:0.05-0.15, wherein the transition metal is one or more selected from the group consisting of Ti, Mn, and Fe, and wherein the rare earth metal is Ce and/or La, said composite metal oxide adsorbent is prepared by a process comprising the steps of:
   (a) preparing an aqueous solution comprising a transition metal containing compound, Al and/or Mg containing compound, and a rare earth metal containing compound, wherein the transition metal, Al and/or Mg, and the rare earth metal have a molar ratio of 0.05-0.15:0.2-0.6:0.05-0.15;
   (b) adjusting the pH of the aqueous solution to be 8.0 or more to form a precipitate;
   (c) washing the precipitate with deionized water until the pH of the water flowing out is neutral to obtain a washed product;
   (d) drying the washed product at 65-120° C. to a constant weight; and
   (e) baking the washed product at a temperature between 250 to 500° C. to obtain a baked product
   (f) remilling the baked product to produce the composite metal oxide adsorbent; and
   wherein said composite metal oxide adsorbent has a diameter of between 150 and 200 meshes and a saturation adsorption capacity for fluoride of 100 mg/g or more under a neutral condition.

2. The composite metal oxide adsorbent for fluoride removal according to claim 1, wherein the molar ratio of the transition metal, Al and/or Mg, and the rare earth metal is 0.08-0.12:0.35-0.45:0.06-0.1.

3. The composite metal oxide adsorbent for fluoride removal according to claim 1, wherein the molar ratio of the transition metal, Al and/or Mg, and the rare earth metal is about 0.1:0.4:0.1.

4. The composite metal oxide adsorbent of claim 1, wherein said transition metal-containing compound is one or more selected from the group consisting of the nitrate, chloride and sulfate of the transition metal.

5. The composite metal oxide adsorbent of claim 1, wherein said aluminum and/or magnesium-containing compound is one or more selected from the group consisting of aluminum sulfate, aluminum nitrate, aluminum chloride, magnesium sulfate, magnesium nitrate and magnesium chloride.

6. The composite metal oxide adsorbent of claim 1, wherein said rare earth-containing compound is one or more selected from the group consisting of cerium chloride, cerium nitrate, cerium sulfate, lanthanum chloride, lanthanum nitrate and lanthanum sulfate.

* * * * *